(12) United States Patent
Yang et al.

(10) Patent No.: US 12,335,845 B2
(45) Date of Patent: Jun. 17, 2025

(54) NETWORK ACCESS METHOD AND APPARATUS

(71) Applicant: HUAWEI TECHNOLOGIES CO., LTD., Guangdong (CN)

(72) Inventors: Chenchen Yang, Ottawa (CA); Yinghao Jin, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 361 days.

(21) Appl. No.: 17/372,054

(22) Filed: Jul. 9, 2021

(65) Prior Publication Data

US 2021/0337461 A1    Oct. 28, 2021

Related U.S. Application Data

(63) Continuation of application No. PCT/CN2020/081400, filed on Mar. 26, 2020.

(30) Foreign Application Priority Data

Mar. 30, 2019    (CN) .......................... 201910254108.6

(51) Int. Cl.
*H04W 48/08* (2009.01)
*H04W 84/04* (2009.01)

(52) U.S. Cl.
CPC .......... *H04W 48/08* (2013.01); *H04W 84/042* (2013.01)

(58) Field of Classification Search
CPC ... H04W 48/08; H04W 84/042; H04W 88/10; H04W 24/02; H04W 48/02; H04W 76/16;
(Continued)

(56) References Cited

U.S. PATENT DOCUMENTS

2008/0186985 A1    8/2008  Sheth et al.
2014/0242994 A1    8/2014  Xu et al.
(Continued)

FOREIGN PATENT DOCUMENTS

| CN | 101631352 A | 1/2010 |
| CN | 101730102 A | 6/2010 |

(Continued)

OTHER PUBLICATIONS

CT1, "CT aspects of 5GS enhanced support of vertical and LAN services," 3GPP TSG-CT Meeting #83, CP-190195, Shenzhen, P.R. China, Mar. 18-19, 2019, 6 pages.
(Continued)

*Primary Examiner* — Steven Hieu D Nguyen
(74) *Attorney, Agent, or Firm* — Fish & Richardson P.C.

(57) ABSTRACT

This application provides a network access method and an apparatus. In one aspect, a method includes receiving, by a second network device, access capability information from a first network device, where the first network device is a network device in a first-type network, the access capability information indicates a capability of the first network device to access a second-type network, and the first-type network is different from the second-type network, and using, by the second network device, the access capability information.

8 Claims, 5 Drawing Sheets

(58) Field of Classification Search
CPC . H04W 84/105; H04W 88/085; H04W 92/12; H04W 92/14; H04W 92/20; H04W 48/18; H04W 76/10

See application file for complete search history.

(56) References Cited

U.S. PATENT DOCUMENTS

| | | | |
|---|---|---|---|
| 2018/0024918 A1 | 1/2018 | Agarwal et al. | |
| 2018/0249318 A1 | 8/2018 | Ianev et al. | |
| 2020/0314701 A1* | 10/2020 | Talebi Fard | H04W 36/0016 |
| 2020/0314732 A1* | 10/2020 | Park | H04L 5/0055 |
| 2021/0092707 A1* | 3/2021 | Ryu | H04W 76/11 |
| 2021/0092725 A1* | 3/2021 | Park | H04W 76/27 |
| 2021/0385742 A1* | 12/2021 | Liao | H04W 48/02 |
| 2022/0086705 A1* | 3/2022 | Wang | H04W 48/16 |
| 2022/0110009 A1* | 4/2022 | Liu | H04W 24/04 |
| 2022/0132626 A1* | 4/2022 | Xu | H04W 76/11 |

FOREIGN PATENT DOCUMENTS

| | | | | |
|---|---|---|---|---|
| CN | 101784095 A | | 7/2010 | |
| CN | 101790221 A | | 7/2010 | |
| CN | 101873576 A | | 10/2010 | |
| CN | 101873589 A | | 10/2010 | |
| CN | 102340844 A | | 2/2012 | |
| CN | 103220721 A | | 7/2013 | |
| CN | 108990131 A | | 12/2018 | |
| CN | 110536331 A | * | 12/2019 | H04W 24/04 |
| EP | 2918106 A1 | | 9/2015 | |
| WO | 2014072858 A1 | | 5/2014 | |
| WO | WO-2020156217 A1 | * | 8/2020 | H04W 24/04 |

OTHER PUBLICATIONS

Ericsson et al., "Introducing support for Non-Public Networks," 3GPP TSG-SA WG2 Meeting #131, S2-1902898, Tenerife, Spain, Feb. 25-Mar. 1, 10 pages.

Extended European Search Report issued in European Application No. 20784723.7 on Jan. 31, 2022, 14 pages.

Samsung et al., "Update of Solution #4: Support of NPN subscription," 3GPP SA WG2 Meeting #129 Bis, S2-1813179, West Palm Beach, USA, Nov. 26-30, 2018, 6 pages.

Office Action issued in Indian Application No. 202137049361 on Mar. 25, 2022, 6 pages.

3GPP TS 38.413 V15.2.0 (Dec. 2018), "3rd Generation Partnership Project; Technical Specification Group Radio Access Network;NG-RAN;NG Application Protocol (NGAP)(Release 15)," Dec. 2018, 308 pages.

3GPP TS 38.463 V15.2.0 (Dec. 2018), "3rd Generation Partnership Project;Technical Specification Group Radio Access Network;NG-RAN;E1 Application Protocol (E1AP)(Release 15)," Dec. 2018, 160 pages.

3GPP TS 38.423 V15.2.0 (Dec. 2018), "3rd Generation Partnership Project;Technical Specification Group Radio Access Network;NG-RAN;Xn application protocol (XnAP)(Release 15)," Dec. 2018, 281 pages.

3GPP TS 38.473 V15.4.1 (Jan. 2019), "3rd Generation Partnership Project;Technical Specification Group Radio Access Network; NG-RAN;F1 application protocol (F1AP)(Release 15)," Jan. 2019, 192 pages.

Office Action issued in Chinese Application No. 201910254108.6 on Feb. 22, 2021, 17 pages (with English translation).

PCT International Search Report and Written Opinion issued in International Application No. PCT/CN2020/081400 on Jun. 17, 2020, 13 pages (partial English translation).

* cited by examiner

NETWORK ACCESS METHOD AND APPARATUS

CROSS-REFERENCE TO RELATED APPLICATIONS

This application is a continuation of International Application No. PCT/CN2020/081400, filed on Mar. 26, 2020, which claims priority to Chinese Patent Application No. 201910254108.6, filed on Mar. 30, 2019. The disclosures of the aforementioned applications are hereby incorporated by reference in their entireties.

TECHNICAL FIELD

This application relates to the field of wireless communications technologies, and in particular, to a network access method and an apparatus.

BACKGROUND

A non-public network (NPN) is a network under discussion in the 3GPP standard. Different from a public land mobile network (PLMN), the NPN allows access of only some users with specific permission. For the NPN, there are two networking modes: standalone networking and non-standalone networking. In a case of a stand-alone NPN, an NPN and a PLMN each have an independent radio access network (RAN) and an independent core network (CN). The core networks of the NPN and the PLMN are connected through an N3IWF network element. In a case of a non-standalone NPN, access network devices of an NPN and a PLMN share a core network. A part of access network devices in the PLMN may access the NPN, be configured with an NPN cell, and allow access of an NPN terminal. A part of access network devices in the NPN may access the PLMN, be configured with a PLMN cell, and allow access of a PLMN terminal.

For the non-standalone NPN, an access network device in a network (the PLMN or the NPN) may not know a capability of another access network device to access the other network, and similarly, a core network device may not know a capability of an access network device in a network to access the other network. Therefore, a network device (including an access network device or a core network device) blindly performs operations such as user equipment access control, cell measurement parameter configuration, PDU session resource establishment, and subscriber paging, resulting in low operation efficiency.

SUMMARY

This application provides a network access method and an apparatus, to improve efficiency of a network device when the network device performs operations such as user equipment access control, cell measurement parameter configuration, PDU session resource establishment, and subscriber paging.

According to a first aspect, a network access method is provided. The method includes: A first network device sends access capability information to a second network device, where the first network device is a network device in a first-type network, the access capability information is used to indicate a capability of the first network device to access a second-type network, and the first-type network is different from the second-type network.

The capability of the first network device to access the second-type network may include whether the first network device can access a second-type network, a second-type network that is allowed to be accessed, a configured cell or slice of the second-type network, and the like.

In addition, based on configuration per DU, the capability may alternatively include whether the DU can access a second-type network, a second-type network that is allowed to be accessed, a configured cell or slice of the second-type network, and the like.

According to the network access method provided in this application, the information about the capability of the first network device in the first-type network to access the second-type network can be sent to the second network device. The second network device obtains the access capability information, and can perform, based on the access capability information, operations such as user equipment access control, cell measurement parameter configuration, PDU session resource establishment, and subscriber paging. The foregoing more targeted operations improve efficiency of performing the operations.

With reference to the first aspect, in some implementations of the first aspect, the access capability information is used to indicate a capability of at least one cell of the first network device to access the second-type network. Based on configuration per cell, the access capability information may indicate the capability of the at least one cell to access the second-type network, so that a measurement parameter can be properly configured for a terminal device, and the terminal device can access the second-type network through the first-type network.

With reference to the first aspect, in some implementations of the first aspect, the access capability information is further used to indicate at least one of a list of second-type networks that is allowed to be accessed by the at least one cell, a configured cell list of the second-type network, or a configured slice list of the second-type network.

With reference to the first aspect, in some implementations of the first aspect, the access capability information is further used to indicate a capability of at least one slice of the first network device to access the second-type network.

With reference to the first aspect, in some implementations of the first aspect, the first-type network is a PLMN, and the second-type network is an NPN; or the first-type network is an NPN, and the second-type network is a PLMN.

With reference to the first aspect, in some implementations of the first aspect, the first network device is a DU, the second network device is a CU, and the DU sends the access capability information to the CU through an F1 interface.

With reference to the first aspect, in some implementations of the first aspect, the first network device is a CU, and the second network device is a DU.

With reference to the first aspect, in some implementations of the first aspect, the first network device is a CU-UP, the second network device is a CU-CP, and the CU-UP sends the access capability information to the CU-CP through an E1 interface.

With reference to the first aspect, in some implementations of the first aspect, the first network device is a CU-CP, the second network device is a CU-UP.

With reference to the first aspect, in some implementations of the first aspect, the first network device is a first access network device, the second network device is a second access network device, and the first access network device sends the access capability information to the second access network device through an Xn interface.

With reference to the first aspect, in some implementations of the first aspect, the first network device is an access network device, the second network device is a core network device, and the access network device sends the access capability information to the core network device through an NG interface.

With reference to the first aspect, in some implementations of the first aspect, the first network device is a core network device, and the second network device is an access network device.

According to a second aspect, a network access method is provided. The method includes: A second network device receives access capability information from a first network device, where the first network device is a network device in a first-type network, the access capability information is used to indicate a capability of the first network device to access a second-type network, and the first-type network is different from the second-type network.

With reference to the second aspect, in some implementations of the second aspect, the access capability information is used to indicate a capability of at least one cell of the first network device to access the second-type network.

With reference to the second aspect, in some implementations of the second aspect, the access capability information is further used to indicate at least one of a list of second-type networks that is allowed to be accessed by the at least one cell, a configured cell list of the second-type network, or a configured slice list of the second-type network.

With reference to the second aspect, in some implementations of the second aspect, the access capability information is further used to indicate a capability of at least one slice of the first network device to access the second-type network.

With reference to the second aspect, in some implementations of the second aspect, the first-type network is a PLMN, and the second-type network is an NPN; or the first-type network is an NPN, and the second-type network is a PLMN.

With reference to the second aspect, in some implementations of the second aspect, the first network device is a DU, the second network device is a CU, and the CU receives the access capability information from the DU through an F1 interface.

With reference to the second aspect, in some implementations of the second aspect, the first network device is a CU, and the second network device is a DU.

With reference to the second aspect, in some implementations of the second aspect, the first network device is a CU-UP, the second network device is a CU-CP, and the CU-CP receives the access capability information from the CU-UP through an E1 interface.

With reference to the second aspect, in some implementations of the second aspect, the first network device is a CU-CP, and the second network device is a CU-UP.

With reference to the second aspect, in some implementations of the second aspect, the first network device is a first access network device, the second network device is a second access network device, and the second access network device receives the access capability information from the first access network device through an Xn interface.

With reference to the second aspect, in some implementations of the second aspect, the first network device is an access network device, the second network device is a core network device, and the core network device receives the access capability information from the access network device through an NG interface.

With reference to the second aspect, in some implementations of the second aspect, the first network device is a core network device, and the second network device is an access network device.

According to a third aspect, a network access apparatus is provided. The apparatus includes a transceiver unit, configured to send access capability information to a second network device, where the apparatus is a network device in a first-type network, the access capability information is used to indicate a capability of the apparatus to access a second-type network, and the first-type network is different from the second-type network.

According to a fourth aspect, a network access apparatus is provided. The apparatus includes a transceiver unit, configured to receive access capability information from a first network device, where the first network device is a network device in a first-type network, the access capability information is used to indicate a capability of the first network device to access a second-type network, and the first-type network is different from the second-type network.

According to a fifth aspect, a communications apparatus is provided. The apparatus includes a processor, where the processor is configured to: be coupled to a memory, and read instructions or programs stored in the memory. Optionally, the communications apparatus may further include the memory, and the memory is configured to store the instructions or the programs. The processor is configured to invoke the instructions or the programs from the memory and run the instructions or the programs, so that the communications apparatus performs the communication method in any one of the first aspect, the second aspect, or the possible implementations of the first aspect or the second aspect.

Optionally, there are one or more processors, and there are one or more memories.

Optionally, the memory may be integrated with the processor, or the memory and the processor are disposed separately.

Optionally, the communications apparatus further includes a transmitter (a transmitter machine) and a receiver (a receiver machine).

According to a sixth aspect, a communications system is provided. The system includes the communications apparatus provided in the third aspect or the fourth aspect.

In a possible design, the communications system may further include another device that interacts with the communications apparatus and that is in the solutions provided in the embodiments of this application.

According to a seventh aspect, a computer program product is provided. The computer program product includes computer programs (which may also be referred to as code or instructions). When the computer programs are run, a computer is enabled to perform the method according to any one of the possible implementations of the first aspect or the second aspect.

According to an eighth aspect, a computer-readable medium is provided. The computer-readable medium stores computer programs (which may also be referred to as code or instructions). When the computer programs are run on a computer, the computer is enabled to perform the method according to any one of the possible implementations of the first aspect or the second aspect.

According to a ninth aspect, a chip or a chip system is provided. The chip or the chip system includes a processor, where the processor is configured to: be coupled to a memory, and read instructions or programs stored in the memory. Optionally, the chip or the chip system may further include the memory, and the memory is configured to store the instructions or the programs. The processor is configured to invoke the instructions or the programs from the memory and run the instructions or the programs, so that a communications device or a communications apparatus in which the chip is mounted or the chip system is installed performs the method according to any one of the possible implementations of the first aspect or the second aspect.

The chip system may include an output circuit or interface configured to send information or data, and an input circuit or interface configured to receive information or data.

DESCRIPTION OF EMBODIMENTS

Figure 1:
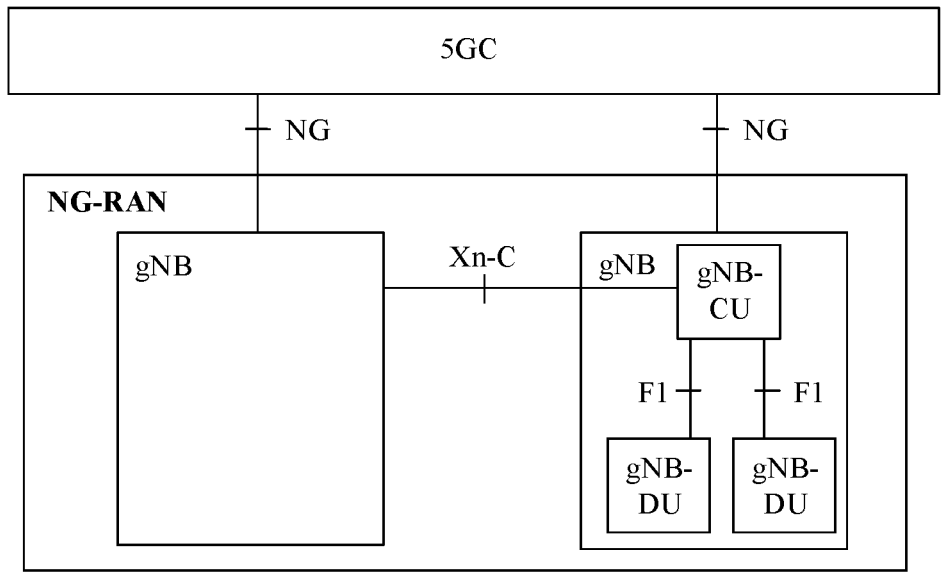
FIG. 1 shows an overall architecture of a gNB in a 5G network.

The following describes technical solutions of this application with reference to the accompanying drawings.

The technical solutions in embodiments of this application may be used in various communications systems, for example, a long term evolution (LTE) system, an LTE frequency division duplex (FDD) system, an LTE time division duplex (TDD) system, a universal mobile telecommunications system (UMTS), a 5th generation (5G) system or a new radio (NR) system, or another evolved communications system.

A terminal device in the embodiments of this application may also be referred to as a terminal, user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communications device, a user agent, a user apparatus, or the like.

The terminal device may be a device that provides a user with voice/data connectivity, for example, a handheld device or a vehicle-mounted device having a wireless connection function. Currently, some examples of the terminal are: a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home (smart home), a cellular phone, a cordless phone, a session initiation protocol (session initiation protocol, SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile communications network (PLMN), and the like. This is not limited in the embodiments of this application.

As an example instead of a limitation, in the embodiments of this application, the terminal device may alternatively be a wearable device. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments of this application may alternatively be a terminal device in an internet of things (IoT) system. IoT is an important part of future development of information technologies. A main technical feature of IoT is connecting a thing to a network by using a communications technology, to implement an intelligent network for interconnection between a person and a machine or between one thing and another.

In addition, an access network device in the embodiments of this application can provide a network access function for an authorized user in a specific area, and can use transmission tunnels of different quality based on a user level, a service requirement, and the like. Access networks may use different access technologies. Currently, radio access technologies include: a 3rd generation partnership project (3GPP) access technology and a non-3rd generation partnership project (non-3GPP) access technology. The 3GPP access technology is an access technology that complies with a 3GPP standard specification, for example, a radio access technology used in a 3rd generation (3G) system, a 4th generation (4G) system, or a 5G system. An access network in which the 3GPP access technology is used is referred to as a radio access network (RAN). An access network device in the 5G system is referred to as a next-generation base station node (gNB). The non-3GPP access technology is an access technology that does not comply with the 3GPP standard specification, for example, an air interface technology represented by wireless fidelity (Wi-Fi).

An access network that implements a network access function by using a wireless communications technology may be referred to as an access network. The radio access network can manage radio resources, provide an access service for the terminal device, and further complete forwarding of a control signal and user data between the terminal device and a core network.

The access network device in the embodiments of this application may also be referred to as a radio access network device, a base station, or the like, and may be a transmit and receive point (TRP), may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in an LTE system, may be a base station controller (BSC), a base transceiver station (BTS), a home base station (for example, home evolved NodeB or home Node B, HNB), or a baseband unit (BBU), or may be a radio controller in a cloud radio access network (CRAN) scenario. Alternatively, the access network device may be a relay station, an access point, a vehicle-mounted device, a wearable device, a network device in a 5G network, a network device in a future evolved PLMN, or the like, may be an access point (AP) in a WLAN, or may be a new radio NodeB (gNB) in a new radio (NR) system. This is not limited in the embodiments of this application.

In a network structure, the access network device may include a centralized unit (CU) node, a distributed unit (DU) node, a RAN device including a CU node and a DU node, or a RAN device including a CU control plane node (CU-CP node), a CU user plane node (CU-UP node), and a DU node.

The access network device provides a service for the terminal device by using a cell or a transmit and receive point in a cell. The terminal device communicates with the cell or the transmit and receive point in the cell by using a transmission resource (for example, a frequency domain resource, a frequency spectrum resource, or a time domain resource) allocated by the access network device. The cell may be a cell corresponding to the transmit and receive point. The cell may belong to a macro base station (for example, a macro eNB or a macro gNB), or may belong to a base station corresponding to a small cell. The small cell herein may include a metro cell, a micro cell, a pico cell, a femto cell, and the like. These small cells feature small coverage and low transmit power, and are applicable to providing a high-rate data transmission service.

The core network device in the embodiments of this application may be configured to implement functions such as call connection, charging, mobility management, and a supplementary service. In the 5G system, the core network device may include, for example, an access and mobility management function (AMF) entity, a session management function (SMF) entity, and a user plane function (UPF) entity. The embodiments of this application mainly relate to communication with an AMF entity. Therefore, a brief description of the AMF entity is provided herein. The AMF entity may also be referred to as an AMF for short, is mainly used for mobility management, access management, and the like, and may be configured to implement other functions that are in mobility management entity (MME) functions and that are other than session management, for example, lawful interception, and access authorization or authentication. The following uses the AMF in 5G as an example of a network element used for mobility and access management, and shall not constitute any limitation on this application. This application does not exclude a possibility of replacing the AMF with another network element to implement same or similar functions The access network device and the core network device may be collectively referred to as a network device in the following embodiments.

To help understand the technical solutions in the embodiments of this application, the following describes a base station gNB in a 5G network.

FIG. 1 shows an overall architecture of the gNB in the 5G network. As shown in FIG. 1, a new architecture (CU-DU architecture) is defined for the gNB in the 5G network. To be specific, the gNB is divided into two parts based on protocol stack functions: a centralized unit and a distributed unit.

The CU-DU architecture has the following features:

(1) The CU includes protocol stack entities RRC, SDAP, and PDCP, and the DU includes protocol stack entities RLC, MAC, and PHY.

(2) One gNB may include one CU and at least one DU, and the CU and the DU are connected through an F1 interface.

(3) The CU is connected to another gNB through an Xn interface.

(4) The CU is connected to a 5G core network (5G core, 5GC) through an NG interface.

In addition, in a specific implementation process, in consideration of system stability, one DU may be connected to a plurality of CUs.

Figure 2:
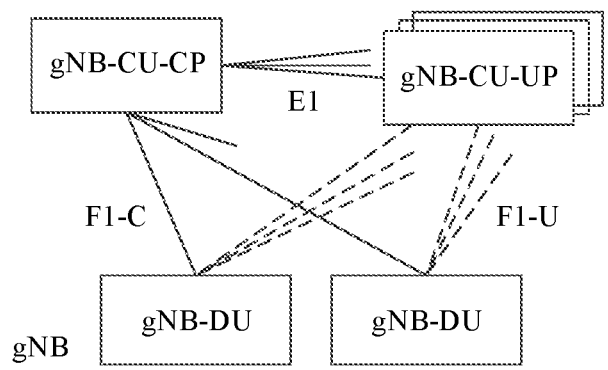
FIG. 2 is a schematic diagram of connection between network elements of a 5G disaggregated base station.

Further, a structure of the CU may be further subdivided. FIG. 2 is a schematic diagram of connection between network elements of a 5G disaggregated base station.

Refer to FIG. 2. The gNB-CU may be further divided into one gNB-CU-CP and at least one gNB-CU-UP, which are respectively used for control plane management and user plane data transmission. An interface between the gNB-CU-CP and the gNB-CU-UP is an E1 interface. An interface between the gNB-CU-CP and the gNB-DU is an F1-C interface, and is used for control plane signaling transmission. An interface between the gNB-CU-UP and the gNB-DU is an F1-U interface, and is used for user plane data transmission. An interface connecting gNB-CU-UPs is an Xn-U interface, and is used for only user plane data transmission.

The following further describes an NPN with reference to the accompanying drawings.

The NPN is a network that is being discussed in the 3GPP standard. Different from a conventional cellular network, the NPN allows access of only some users with specific permission. For the NPN, there are two networking modes: standalone networking and non-standalone networking. In the non-standalone networking, one or more users with specific permission to access the NPN are referred to as a closed access group (CAG).

Figure 3:
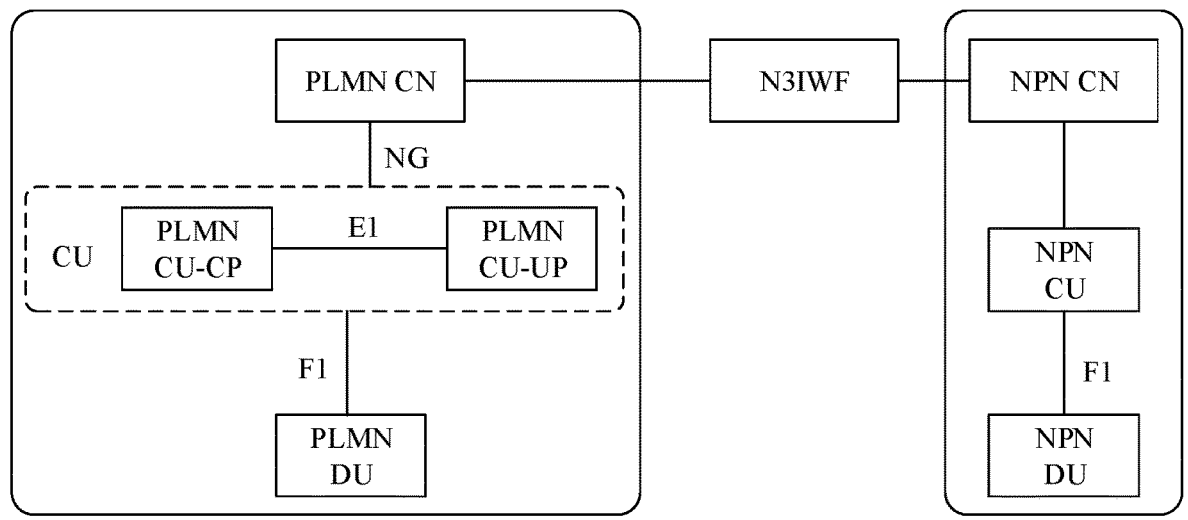
FIG. 3 is a schematic structural diagram of a stand-alone NPN.

FIG. 3 is a schematic structural diagram of a stand-alone NPN. As shown in FIG. 3, in the stand-alone NPN, an NPN and a PLMN each have an independent RAN and an independent CN. The CNs are connected to each other by using a N3IWF network element. User plane data can be transmitted by using the N3IWF network element, but control signaling cannot be transmitted by using the N3IWF network element.

Figure 4:
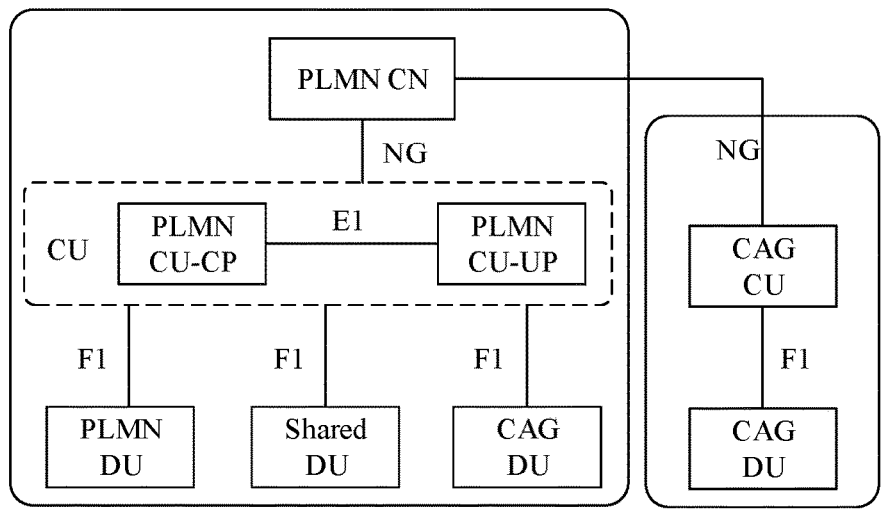
FIG. 4 is a schematic structural diagram of a non-standalone NPN.

FIG. 4 is a schematic structural diagram of a non-standalone NPN. As shown in FIG. 4, in the non-standalone NPN, an NPN and a PLMN share a core network. A PLMN CU can be shared by the PLMN and the NPN, and can be connected to a PLMN DU and an NPN DU at the same time. A DU can also be shared by the PLMN and the NPN. There may be a CU and a DU that are used only in the PLMN or the NPN. In FIG. 4, because the NPN is a non-standalone network, the foregoing NPN DU and NPN CU may also be respectively referred to as a CAG DU and a CAG CU, and a cell of the CAG DU may be referred to as a CAG cell.

Figure 5:
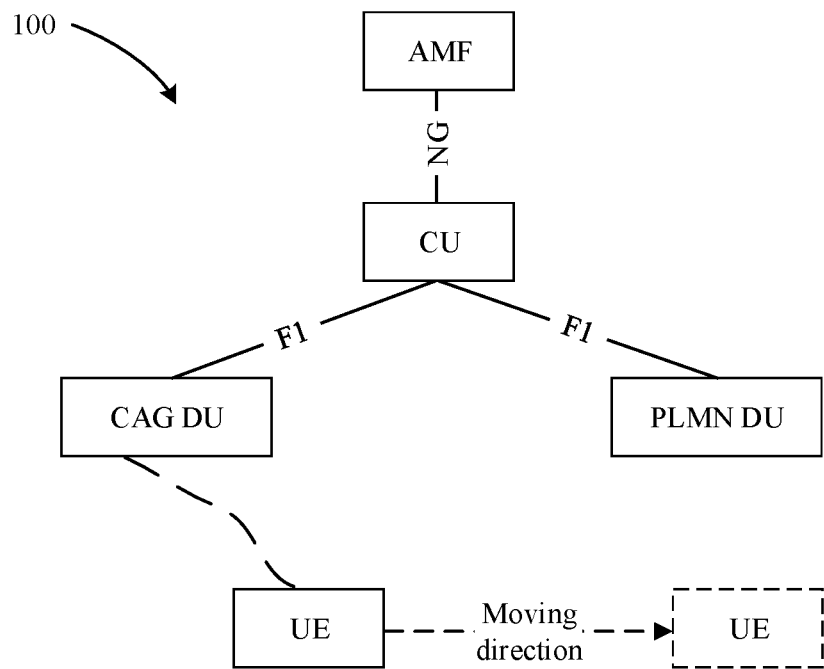
FIG. 5 is a schematic diagram of a system applicable to a handover method according to an embodiment of this application.

FIG. 5 is a schematic diagram of a system 100 applicable to a handover method according to an embodiment of this application.

In FIG. 5, a core network element AMF is connected to a CU through an NG interface, the CU is connected to two different DUs (an NPN DU and a PLMN DU) through F1 interfaces, and UE is connected to the NPN DU. As the UE continuously moves to a right side in the figure, an inter-cell handover may occur. Because the CU may not know whether the PLMN DU can access an NPN, a measurement parameter configured by the CU for the UE may be improper. For example, a measurement target configured by the CU for the UE may include a cell of the PLMN DU, but the cell may not be able to access an NPN, and even if the UE is connected to the cell subsequently, the UE cannot access an NPN. Consequently, efficiency of an access operation is reduced.

In addition, the AMF may not know whether the PLMN DU can access an NPN either, and the AMF may establish an NPN protocol data unit (PDU) session with the PLMN DU. If the PLMN DU does not have a capability of accessing an NPN, establishment of the PDU session is ineffective and wasteful, and is not supportive of transmitting user data on a corresponding PDU session resource.

Further, due to a PDU session from a PLMN, the AMF may enable an NPN DU that supports only an NPN to page the UE; or due to a PDU session from an NPN, the AMF may enable a PLMN DU that supports only a PLMN to page the UE. In these cases, paging is ineffective and wasteful.

Based on the foregoing analysis, this application provides a network access method, to improve efficiency of a network device when the network device performs operations such as user equipment access control, cell measurement parameter configuration, PDU session resource establishment, and subscriber paging.

The following describes the method provided in the embodiments of this application. As an example instead of a limitation, in the following description, a first network device may be the PLMN DU in FIG. 5, and a second network device may be the CU in FIG. 5. Alternatively, a first network device may be the CU in FIG. 5, and a second network device may be the AMF in FIG. 5.

Figure 6:
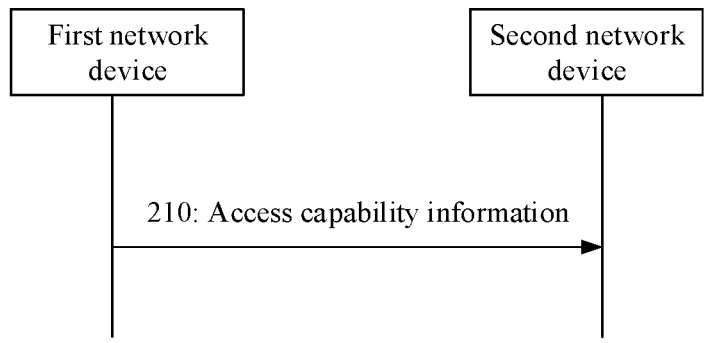
FIG. 6 is a schematic flowchart of an example of a network access method according to this application.

FIG. 6 is a schematic flowchart of a network access method 200 according to this application. The following describes the network access method 200 provided in an embodiment of this application with reference to FIG. 6. The method 200 includes the following step:

Step 210: A first network device sends access capability information to a second network device, where the first network device is a network device in a first-type network, the access capability information is used to indicate a capability of the first network device to access a second-type network, and the first-type network is different from the second-type network.

Specifically, the access capability information is used to indicate the capability of the first network device to access the second-type network, and the capability of the first network device to access the second-type network may be configured by a core network device for the first network device.

That the first network device is a network device in a first-type network may be understood as that the first network device is connected to the first-type network. For a distributed base station such as a distributed gNB, at least one DU in one or more DUs of the distributed base station may be connected to the first-type network.

The access capability information is used to indicate the capability of the first network device to access the second-type network, and the capability may include whether the first network device can access a second-type network, a second-type network that is allowed to be accessed, a configured cell of the second-type network or a configured slice of the second-type network, and the like.

In addition, based on configuration per DU, the capability may alternatively include whether the DU can access a second-type network, a second-type network that is allowed to be accessed, a configured cell or slice of the second-type network, and the like.

For example, the access capability information may indicate at least one of a list of second-type networks that is allowed to be accessed by the first network device, a configured cell list of the second-type network, or a configured slice list of the second-type network.

For another example, the access capability information may indicate at least one of a list of second-type networks that is allowed to be accessed by the at least one DU of the first network device, a configured cell list of the second-type network, or a configured slice list of the second-type network.

In addition, the first network device usually includes one or more served cells, and the access capability information may alternatively be used to indicate an access capability of at least one of the one or more served cells.

Specifically, based on configuration per cell, the access capability information may indicate a capability of the at least one cell to access the second-type network, so that a proper measurement parameter can be configured for a terminal device. For example, a cell that can access a second-type network may be configured as a measurement target of the terminal device, and the terminal device may access the second-type network by accessing the cell, thereby improving measurement and access efficiency of the terminal device.

For example, the access capability information may indicate at least one of a list of second-type networks that is allowed to be accessed by at least one cell of the first network device, a configured cell list of the second-type network, or a configured slice list of the second-type network.

In addition, one served cell may include a plurality of slices. In other words, one or more slices may be served by the first network device, and the access capability information may alternatively be used to indicate an access capability of at least one of the one or more slices.

For example, the access capability information may indicate at least one of a list of second-type networks that is allowed to be accessed by the at least one slice of the first network device, a configured cell list of the second-type network, or a configured slice list of the second-type network.

The first-type network is different from the second-type network. For example, the first-type network may be a PLMN, and the second-type network may be an NPN. Alternatively, the first-type network is an NPN, and the second-type network is a PLMN. In addition, specific types of the first-type network and the second-type network are not limited in this application.

A type of a network in which the second network device is located is not limited in this application. The second network device may be in the first-type network, may be in the second-type network, or may be in a type of network other than the first-type network and the second-type network.

The first network device and the second network device are two different devices. The following describes types of the first network device and the second network device by using examples.

In a possible implementation, the first network device is a DU, and the second network device is a CU. In addition, alternatively, the first network device may be a CU, and the second network device may be a DU.

In another possible implementation, the first network device is a CU-UP, and the second network device is a CU-CP. In addition, alternatively, the first network device may be a CU-CP, and the second network device may be a CU-UP.

In another possible implementation, both the first network device and the second network device are access network devices (for example, base stations or gNBs).

In another possible implementation, the first network device is an access network device (for example, a base station or a gNB), and the second network device is a core network device (for example, an AMF). In addition, alternatively, the first network device may be a core network device, and the first network device may be an access network device.

According to the network access method provided in this embodiment, the information about the capability of the first network device in the first-type network to access the second-type network can be sent to the second network device. The second network device obtains the access capability information, and can perform, based on the access capability information, operations such as user equipment access control, cell measurement parameter configuration, PDU session resource establishment, and subscriber paging. The foregoing more targeted operations improve efficiency of performing the operations.

Based on different selections of the first network device, the second network device, the first-type network, and the second-type network, the following describes the access method provided in this application by using a plurality of embodiments.

Figure 7:
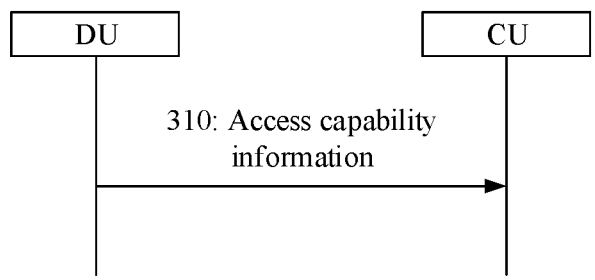
FIG. 7 is a schematic flowchart of another example of a network access method according to this application.

FIG. 7 is a schematic flowchart of a network access method 300 according to this application. In the embodiment shown in FIG. 7, a first network device is a DU, a second network device is a CU, a first-type network is a PLMN, and a second-type network is an NPN.

It should be understood that the foregoing is specified merely for facilitating description of the technical solution provided in this embodiment of this application, and for ease of understanding. In another possible implementation, alternatively, the first network device may be a CU, and the second network device may be a DU. In addition, alternatively, the first-type network may be an NPN, and the second-type network may be a PLMN.

The following describes the network access method 300 provided in this embodiment of this application with reference to FIG. 7. The method 300 includes the following step:

Step 310: A DU sends access capability information to a CU, where the DU is in a PLMN, and the access capability information is used to indicate a capability of the DU to access an NPN.

Specifically, the DU is in the PLMN, and the access capability information may indicate the capability of the DU to access the NPN. The access capability information may be used to indicate whether the DU can access an NPN, an NPN that is allowed to be accessed, a configured cell of the NPN or a slice configured of the NPN, and the like.

For example, the access capability information may indicate at least one of a list of NPNs that is allowed to be accessed by the DU, a configured cell list of the NPN, or a configured slice list of the NPN.

In addition, the DU usually includes one or more served cells, and the access capability information may alternatively be used to indicate an access capability of at least one of the one or more served cells.

For example, the access capability information may indicate at least one of a list of NPNs that is allowed to be accessed by the at least one cell of the DU, a configured cell list of the NPN, or a configured slice list of the NPN.

In addition, one served cell may include a plurality of slices. In other words, one or more slices may be served by the DU, and the access capability information may alternatively be used to indicate an access capability of at least one of the one or more slices.

For example, the access capability information may indicate at least one of a list of NPNs that is allowed to be accessed by at least one slice of the DU, a configured cell list of the NPN, or a configured slice list of the NPN.

The following describes possible implementations of the access capability information (or existence forms of the access capability information) by using examples.

Based on configuration per cell, the access capability information may be used to indicate an access capability of at least one cell (for example, a cell #1) in the one or more served cells. For example, the access capability information may indicate a list of NPNs that is allowed to be accessed by the cell #1 and a configured cell list.

The access capability information may be configured in a mapping list, and a Boolean value information element may be added in the mapping list to identify whether the cell #1 can access an NPN. For example, 1 may identify that the cell #1 can access an NPN, and 0 may identify that the cell #1 cannot access an NPN. In addition, if the cell #1 can access an NPN, an NPN list may be added to identify the NPN that is allowed to be accessed by the cell #1, where each NPN is identified by a network identifier (NPN ID).

The cell list may further be added to identify a CAG cell configured for the cell #1, where each CAG cell is identified by a cell identifier (CAG ID). The terminal device can access the CAG cell to access a PLMN core network or an NPN core network.

In addition, the slice list may be further added to identify an NPN slice configured for the cell #1, where each NPN slice is identified by a slice identifier (single network slice selection assistance information, S-NSSAI).

It should be understood that it is optional to add the Boolean value information element. For example, when at least one of the network list, the cell list, and the slice list is added to the mapping list, it can be indicated that the cell #1 can access an NPN. In this case, the Boolean value information element may not be added to the mapping list.

Optionally, the CU may be in the PLMN, or the CU may be in the NPN.

Optionally, the DU may send the access capability information to the CU through an F1 interface.

Optionally, the access capability information may be carried in an F1 setup request message or a gNB-DU configuration update message.

Optionally, the F1 setup request message or the gNB-DU configuration update message may further include DU served cell information, for example, a cell global identifier (new radio cell global identifier, NR CGI), a physical cell ID (NR PCI), and a tracking area code (TAC) corresponding to a cell.

Optionally, the DU may send the access capability information to the terminal device, so that the terminal device can perform, based on the information, operations such as cell selection and access related to a PLMN cell and/or an NPN cell.

Optionally, after receiving the access capability information, the CU may further send the information to another DU, may further send the information to another access network device (for example, a gNB), or may further send the information to a core network device (for example, an AMF).

Optionally, after receiving the access capability information, the CU may configure a proper measurement parameter such as a measurement target for the terminal device based on the access capability information.

Optionally, the CU may send the information to the another DU through an F1 interface.

Optionally, the CU may send the information to the another access network device through an Xn interface.

Optionally, the CU may send the information to the core network device through an NG interface.

According to the network access method provided in this embodiment, the information about the capability of the DU in the PLMN to access the NPN can be sent to the CU. After obtaining the access capability information, the CU may perform a next operation, for example, configure a cell measurement parameter for the terminal device, or forward the information to the core network device, so that efficiency of performing operations such as terminal device access control, cell measurement parameter configuration, PDU session resource establishment, and subscriber paging can be improved.

Figure 8:
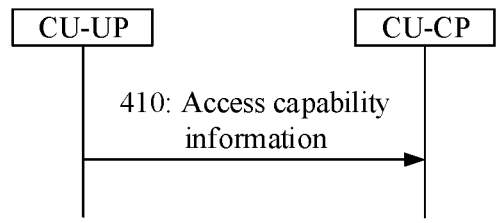
FIG. 8 is a schematic flowchart of still another example of a network access method according to this application.

FIG. 8 is a schematic flowchart of a network access method 400 according to this application. In the embodiment shown in FIG. 8, a first network device is a CU-UP, a second network device is a CU-CP, a first-type network is a PLMN, and a second-type network is an NPN.

It should be understood that the foregoing is specified merely for facilitating description of the technical solution provided in this embodiment of this application, and for ease of understanding. In another possible implementation, alternatively, the first network device may be a CU-CP, and the second network device may be a CU-UP. In addition, alternatively, the first-type network may be an NPN, and the second-type network is a PLMN.

The following describes the network access method 400 provided in this embodiment of this application with reference to FIG. 8. The method 400 includes the following step:

Step 410: A CU-UP sends access capability information to a CU-CP, where the CU-UP is in a PLMN, and the access capability information is used to indicate a capability of the CU-UP to access an NPN.

Specifically, the CU-UP is in the PLMN, and the access capability information may indicate the capability of the CU-UP to access the NPN. The access capability information may be used to indicate whether the CU-UP can access an NPN, an NPN that is allowed to be accessed, and a configured cell of the NPN or a configured slice of the NPN.

For example, the access capability information may indicate at least one of a list of NPNs that is allowed to be accessed by the CU-UP, a configured cell list of the NPN, or a configured slice list of the NPN.

In addition, the CU-UP usually includes one or more served cells, and the access capability information may alternatively be used to indicate an access capability of at least one of the one or more served cells.

For example, the access capability information may indicate at least one of a list of NPNs that is allowed to be accessed by the at least one cell of the CU-UP, a configured cell list of the NPN, or a configured slice list of the NPN.

In addition, one served cell may include a plurality of slices. In other words, one or more slices may be served by the CU-UP, and the access capability information may alternatively be used to indicate an access capability of at least one of the one or more slices.

For example, the access capability information may indicate at least one of a list of second-type networks that is allowed to be accessed by at least one slice of the CU-UP, a configured cell list of the NPN, or a configured slice list of the NPN.

For a possible implementation (or an existence form) of the access capability information, refer to related descriptions in the foregoing method 300. Details are not described herein again.

Optionally, the CU-UP may send the access capability information to the CU-CP through an E1 interface.

Optionally, the access capability information may be carried in an E1 setup request message or a gNB-CU-UP configuration update message.

Optionally, the E1 setup request message or the gNB-CU-UP configuration update message may further include information about a served cell of a gNB-CU-UP, for example, a cell global identifier, a physical cell ID, and a paging tracking area code corresponding to a cell.

According to the network access method provided in this embodiment, the information about a capability of the CU-UP in the PLMN to access the NPN can be sent to the CU-CP. After obtaining the access capability information, the CU-CP may perform a next operation, for example, configuring a cell measurement parameter for the terminal device, or forwarding the message to the core network device, so that efficiency of performing operations such as terminal device access control, cell measurement parameter configuration, PDU session resource establishment, and subscriber paging can be improved.

Figure 9:
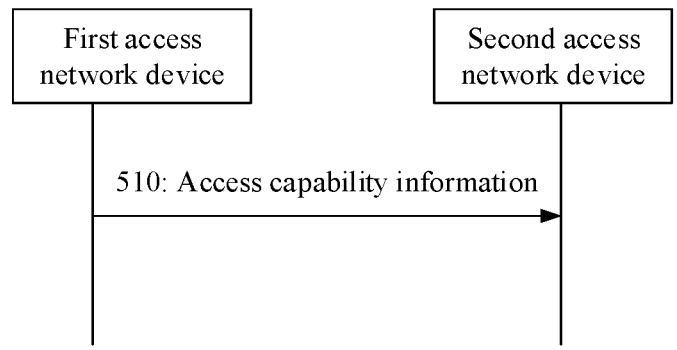
FIG. 9 is a schematic flowchart of still another example of a network access method according to this application.

FIG. 9 is a schematic flowchart of a network access method 500 according to this application. In the embodiment shown in FIG. 9, a first network device is a first access network device, a second network device is a second access network device, a first-type network is an NPN, and a second-type network is a PLMN. At least one of the first access network device and the second access network device may be a gNB.

It should be understood that the foregoing is specified merely for facilitating description of the technical solution provided in this embodiment of this application, and for ease of understanding. In another possible implementation, alternatively, the first-type network may be a PLMN, and the second-type network may be an NPN.

The following describes the network access method 500 provided in this embodiment of this application with reference to FIG. 9. The method 500 includes the following step:

Step 510: A first access network device sends access capability information to a second access network device, where the first access network device is in an NPN, and the access capability information is used to indicate a capability of the first access network device to access a PLMN.

Specifically, the first access network device is in the NPN (and for a distributed gNB, some DUs may be in the NPN), and the access capability information may indicate the capability of the first access network device to access the PLMN. The access capability information may be used to indicate whether the first access network device can access a PLMN, a PLMN that is allowed to be accessed, and a configured cell of the PLMN or a configured slice of the PLMN.

For example, the access capability information may indicate at least one of a list of PLMNs that is allowed to be accessed by the first access network device, a configured cell list of the PLMN, or a configured slice list of the PLMN.

In addition, one or more DUs are usually included in the distributed gNB, and the access capability information may alternatively be used to indicate an access capability of at least one DU in the one or more DUs.

In addition, the first access network device usually includes one or more served cells, and the access capability information may alternatively be used to indicate an access capability of at least one of the one or more served cells.

For example, the access capability information may indicate at least one of a list of PLMNs that is allowed to be accessed by the at least one cell of the first access network device, a configured cell list of the PLMN, or a configured slice list of the PLMN.

In addition, one served cell may include a plurality of slices. In other words, one or more slices may be served by the first access network device, and the access capability information may alternatively be used to indicate an access capability of at least one of the one or more slices.

For example, the access capability information may indicate at least one of a list of PLMNs that is allowed to be accessed by the at least one slice of the first access network device, a configured cell list of the PLMN, or a configured slice list of the PLMN.

For a possible implementation (or an existence form) of the access capability information, refer to related descriptions in the foregoing method 300. Details are not described herein again.

Optionally, the first access network device may send the access capability information to the second access network device through an Xn interface.

Optionally, the access capability information may be carried in an Xn setup request message or a node configuration update (NG-RAN node configuration update) message.

Optionally, the Xn setup request message or the node configuration update message may further include information about a served cell of the first access network device and information about a neighboring cell, for example, a cell global identifier, a physical cell ID, and a paging tracking area code corresponding to a cell.

Optionally, the access capability information may be carried in a system message or a radio resource control (RRC) message.

According to the network access method provided in this embodiment, the information about a capability of the first access network device in the NPN to access the PLMN can be sent to the second access network device. After obtaining the access capability information, the second access network device may perform a next operation, for example, configuring a cell measurement parameter for the terminal device, or forwarding the message to the core network device, so that efficiency of performing operations such as terminal device access control, cell measurement parameter configuration, PDU session resource establishment, and subscriber paging can be improved.

Figure 10:
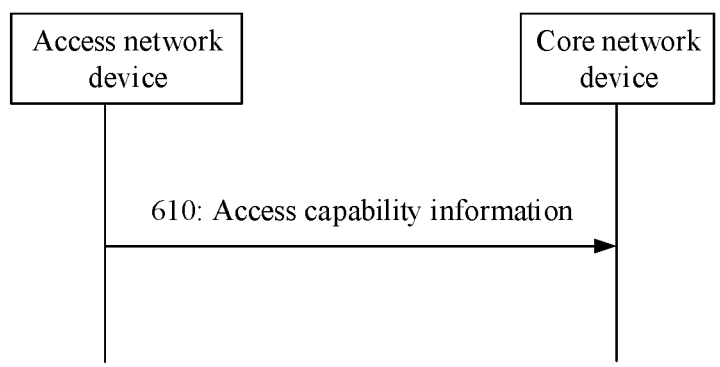
FIG. 10 is a schematic flowchart of still another example of a network access method according to this application.

FIG. 10 is a schematic flowchart of a network access method 600 according to this application. In the embodiment shown in FIG. 10, a first network device is an access network device, a second network device is a core network device, a first-type network is an NPN, and a second-type network is a PLMN. Optionally, the access network device may be a gNB, and the core network device may be an AMF.

It should be understood that the foregoing is specified merely for facilitating description of the technical solution provided in this embodiment of this application, and for ease of understanding. In another possible implementation, alternatively, the first-type network may be a PLMN, and the second-type network may be an NPN.

The following describes the network access method 600 provided in this embodiment of this application with reference to FIG. 10. The method 600 includes the following step:

Step 610: An access network device sends access capability information to a core network device, where the access network device is in an NPN, and the access capability information is used to indicate a capability of the access network device to access a PLMN.

Specifically, the access network device is in the NPN (and for a distributed gNB, some DUs may be in the NPN), and the access capability information may indicate the capability of the access network device to access the PLMN. The access capability information may be used to indicate whether the access network device can access a PLMN, a PLMN that is allowed to be accessed, and a configured cell of the PLMN or a configured slice of the PLMN.

For example, the access capability information may indicate at least one of a list of PLMNs that is allowed to be accessed by the access network device, a configured cell list of the PLMN, or a configured slice list of the PLMN.

In addition, one or more DUs are usually included in the distributed gNB, and the access capability information may alternatively be used to indicate an access capability of at least one DU in the one or more DUs.

In addition, the access network device usually includes one or more served cells, and the access capability information may alternatively be used to indicate an access capability of at least one of the one or more served cells.

For example, the access capability information may indicate at least one of a list of PLMNs that is allowed to be accessed by the at least one cell of the access network device, configured cell list of the PLMN, or a configured slice list of the PLMN.

In addition, one served cell may include a plurality of slices. In other words, one or more slices may be served by the access network device, and the access capability information may alternatively be used to indicate an access capability of at least one of the one or more slices.

For example, the access capability information may indicate at least one of a list of PLMNs that is allowed to be accessed by the at least one slice of the access network device, a configured cell list of the PLMN, or a configured slice list of the PLMN.

For a possible implementation (or an existence form) of the access capability information, refer to related descriptions in the foregoing method 300. Details are not described herein again.

Optionally, the access network device may send the access capability information to the core network device through an NG interface.

Optionally, the access capability information may be carried in an NG setup request message or a RAN node configuration update message.

Optionally, the NG setup request message or the RAN node configuration update message may further include a list of tracking areas (TA) to which the access network device belongs, where each tracking area is identified by a paging tracking area code, each tracking area includes several NPNs, each NPN is identified by an NPN ID, each of a list of slices supported by the NPN is identified by an S-NSSAI.

Optionally, the access capability information may be carried in a system message or a radio resource control message.

According to the network access method provided in this embodiment, the information about a capability of the access network device in the NPN to access the PLMN can be sent to the core network device. After obtaining the access capability information, the core network device may initiate a PDU session in a proper manner, initiate subscriber paging, and the like, so that efficiency of performing operations such as PDU session resource establishment and subscriber paging can be improved.

Figure 11:
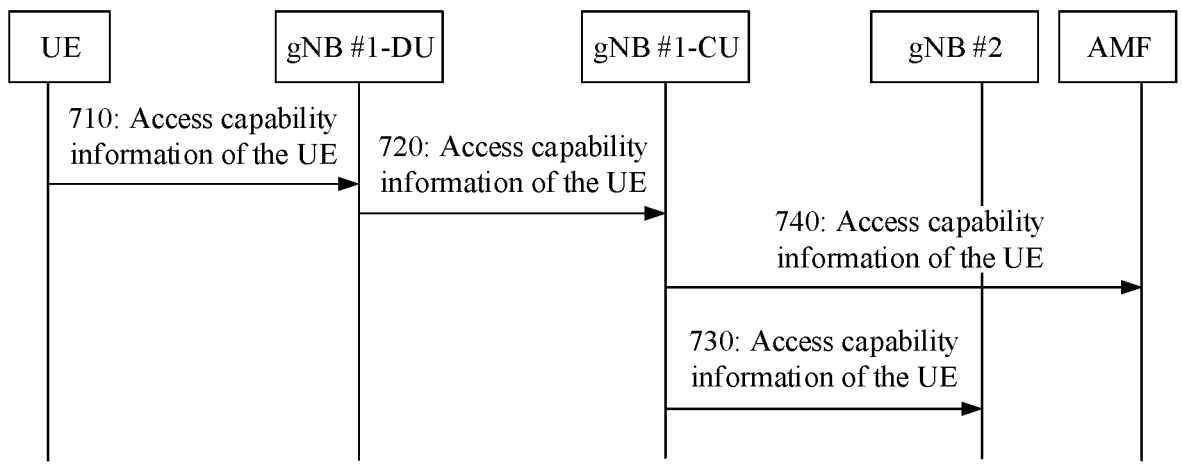
FIG. 11 is a schematic flowchart of still another example of a network access method according to this application.

FIG. 11 is a schematic flowchart of a network access method 700 according to this application. In the embodiment shown in FIG. 11, a terminal device may report an access capability of the terminal device to a network device.

The following describes the network access method 700 provided in this embodiment of this application with reference to FIG. 11. The method 700 includes the following steps:

Step 710: UE sends access capability information to a gNB #1-DU, where the access capability information is used to indicate a capability of the UE to access a first-type network.

Step 720: The gNB #1-DU sends the access capability information to a gNB #1-CU.

Step 730: The gNB #1-CU sends the access capability information to a gNB #2.

Step 740: The gNB #1-CU sends the access capability information to an AMF.

The gNB #1-DU and the gNB #1-CU may both belong to a gNB #1, and the gNB #1 and the gNB #2 are two different gNBs.

The first-type network may be an NPN, or may be a PLMN. An NPN is used as an example. The capability of the UE to access the first-type network may include whether the UE can access an NPN, an NPN that can be accessed, and a cell of the NPN that can be accessed or a slice of the NPN that can be accessed.

Optionally, the UE may be in a PLMN.

In step 710, the UE may report the access capability information to a gNB-DU by using UE capability information signaling.

In step 720, the gNB-DU may report the access capability information to a gNB-CU in a UE context setup process.

In step 730, the gNB-CU may send the received access capability information to the gNB #2 and the like by using handover preparation information.

In step 740, the gNB-CU may report the received access capability information to the AMF by using UE radio capability information indication signaling.

According to the network access method provided in this embodiment, a network side learns the capability of the UE to access the first-type network, and may further perform operations such as paging, measurement configuration, and session establishment on the network side.

Figure 12:
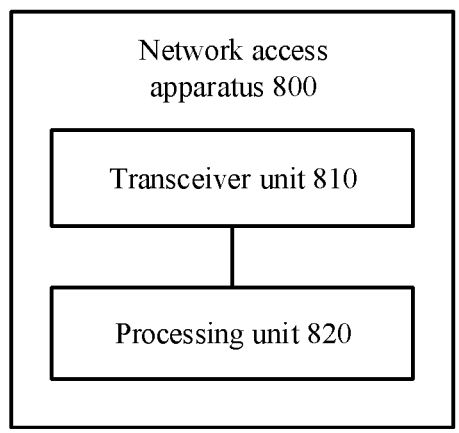
FIG. 12 is a schematic block diagram of a network access apparatus according to this application.
Figure 13:
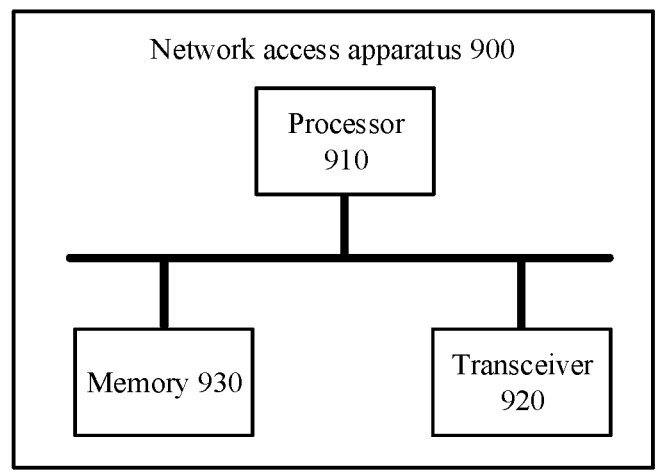
FIG. 13 is a schematic block diagram of a network access apparatus according to this application.

With reference to FIG. 6 to FIG. 11, the foregoing describes in detail the network access method provided in the embodiments of this application. With reference to FIG. 12 and FIG. 13, the following describes in detail a network access apparatus provided in the embodiments of this application.

FIG. 12 is a schematic block diagram of a network access apparatus 800 according to an embodiment of this application. As shown in the figure, the apparatus 800 may include a transceiver unit 810 and a processing unit 820.

In a possible design, the apparatus 800 may be the first network device in the foregoing method embodiments, or may be a chip configured to implement a function of the first network device in the foregoing method embodiments.

Specifically, the apparatus 800 may correspond to the first network device in the methods 200 to 600 according to the embodiments of this application. The apparatus 800 may include units configured to perform the methods performed by the first network device in the methods 200 to 600. In addition, the units in the apparatus 800 and the foregoing other operations and/or functions are used/performed to implement corresponding procedures in the methods 200 to 600 in FIG. 6 to FIG. 10 respectively. It should be understood that specific processes of performing the corresponding steps by the units are detailed in the foregoing method embodiments. For brevity, details are not described herein again.

In another possible design, the apparatus 800 may be the second network device in the foregoing method embodiments, or may be a chip configured to implement a function of the second network device in the foregoing method embodiments.

Specifically, the apparatus 800 may correspond to the second terminal device in the methods 200 to 600 according to the embodiments of this application. The apparatus 800 may include units configured to perform the methods performed by the second terminal device in the methods 200 to 600. In addition, the units in the apparatus 800 and the foregoing other operations and/or functions are used/performed to implement corresponding procedures in the methods 200 to 600 in FIG. 6 to FIG. 10. It should be understood that specific processes of performing the corresponding steps by the units are detailed in the foregoing method embodiments. For brevity, details are not described herein again.

FIG. 13 is a schematic block diagram of a network access apparatus 900 according to an embodiment of this application. As shown in FIG. 13, the device 900 includes a processor 910 and a transceiver 920. The processor 910 is coupled to a memory, and is configured to execute instructions stored in the memory, to control the transceiver 920 to send and/or receive a signal. Optionally, the device 900 further includes a memory 930, configured to store instructions.

It should be understood that the processor 910 and the memory 930 may be integrated into one processing apparatus. The processor 910 is configured to execute program code stored in the memory 930 to implement the foregoing functions. During specific implementation, the memory 930 may also be integrated into the processor 910, or may be independent of the processor 910.

It should be further understood that the transceiver 920 may include a receiver (also referred to as a receive machine) and a transmitter (also referred to as a transmit machine). The transceiver may further include an antenna, and there may be one or more antennas.

In a possible design, the device 900 may be the first network device in the foregoing method embodiments, or may be a chip configured to implement a function of the first network device in the foregoing method embodiments.

Specifically, the device 900 may correspond to the first network device in the methods 200 to 600 according to the embodiments of this application. The device 900 may include units configured to perform the methods performed by the first network device in the methods 200 to 600. In addition, the units in the device 900 and the foregoing other operations and/or functions are used/performed to implement corresponding procedures in the methods 200 to 600 in FIG. 6 to FIG. 10. It should be understood that specific processes of performing the corresponding steps by the units are detailed in the foregoing method embodiments. For brevity, details are not described herein again.

In another possible design, the device 900 may be the second network device in the foregoing method embodiments, or may be a chip configured to implement a function of the second network device in the foregoing method embodiments.

Specifically, the device 900 may correspond to the second network device in the methods 200 to 600 according to the embodiments of this application. The device 900 may include units configured to perform the methods performed by the second network device in the methods 200 to 600. In addition, the units in the device 900 and the foregoing other operations and/or functions are used/performed to implement corresponding procedures in the methods 200 to 600 in FIG. 6 to FIG. 10. It should be understood that specific processes of performing the corresponding steps by the units are detailed in the foregoing method embodiments. For brevity, details are not described herein again.

Based on the methods provided in the embodiments of this application, this application further provides a computer program product. The computer program product includes computer program code. When the computer program code is run on a computer, the computer is enabled to perform the method in any of the embodiments shown in FIG. 6 to FIG. 10.

Based on the methods provided in the embodiments of this application, this application further provides a computer-readable medium. The computer-readable medium stores program code. When the program code is run on a computer, the computer is enabled to perform the method in any of the embodiments shown in FIG. 6 to FIG. 10.

According to the methods provided in the embodiments of this application, this application further provides a system. The system includes the foregoing first network device and second network device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instruction is loaded and executed on a computer, all or some of the procedure or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network elements in the foregoing apparatus embodiments may totally correspond to the network elements in the method embodiments. A corresponding module or unit performs a corresponding step. For example, a transceiver unit (transceiver) performs a receiving step or a sending step in the method embodiments, and a processing unit (processor) may perform another step other than the sending step and the receiving step. For specific functions of the units, refer to the corresponding method embodiments. There may be one or more processors.

In this application, "at least one" refers to one or more, and "a plurality of" refers to two or more. The term "and/or" describes an association relationship between associated objects and represents that three relationships may exist. For example, A and/or B may represent the following cases: Only A exists, both A and B exist, and only B exists, where A and B may be singular or plural. The character "/" generally represents an "or" relationship between the associated objects. "at least one item (one) of the following" or a similar expression thereof represents a single item or any combination of a plurality of items. For example, "at least one of a, b, or c" may indicate: a; b; c; a and b; a and c; b and c; or a, b, and c, where a, b, and c may each be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" throughout the entire specification does not necessarily refer to a same embodiment. In addition, these particular features, structures, or characteristics may be combined in one or more embodiments in any appropriate manner. It should be understood that in various embodiments of this application, sequence numbers of the foregoing processes do not mean execution sequences. The execution sequences of the processes should be determined based on functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that is run on a processor, a processor, an object, an executable file, an execution thread, a program, and/or a computer. As shown in figures, both a computing device and an application that is run on a computing device may be components. One or more components may reside within a process and/or an execution thread, and the components may be located on one computer and/or distributed between two or more computers. In addition, these components may be executed on various computer-readable media that store various data structures. For example, the components may perform communication by using a local and/or remote process and based on a signal having one or more data packets (for example, data from two components interacting with another component such as the internet interacting with another system by using a signal in a local system, or a distributed system and/or a distributed network).

A person of ordinary skill in the art may be aware that illustrative logical blocks and steps described with reference to the embodiments disclosed in this specification may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such an implementation goes beyond the scope of this application.

A person skilled in the art may clearly understand that, for the purpose of convenient and brief description, for detailed working processes of the foregoing system, apparatus, and units, refer to corresponding processes in the foregoing method embodiment. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objective of the solutions of the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by using software, hardware, firmware, or any combination thereof. When software is used to implement the functions, all or some of the functions may be implemented in a form of a computer program product. The computer program product includes one or more computer instructions (programs). When the computer program instructions (programs) are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing describes merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network access method, comprising:
   receiving, by a second network device, access capability information from a first network device through an E1 interface, wherein the first network device is a CU-user plane (CU-UP), the second network device is a CU-control plane (CU-CP), wherein the first network device is a network device of a first-type network, the access capability information indicates a capability of the first network device to access a second-type network, and the first-type network is different from the second-type network, wherein the access capability information comprises a list of network identifiers of the second-type network that is allowed to be accessed by at least one cell, wherein the first-type network is a public land mobile network (PLMN), and the second-type network is a stand-alone non-public network (NPN); or the first-type network is a stand-alone NPN, and the second-type network is a PLMN, wherein the access capability information further comprises a list of slices that are allowed to be accessed by the at least one cell and a configured cell list of the NPN; and
   using, by the second network device, the access capability information.

2. The method according to claim 1, wherein the access capability information indicates a capability of at least one cell of the first network device to access the second-type network.

3. The method according to claim 1, wherein the access capability information indicates a capability of at least one slice of the first network device to access the second-type network.

4. A communications apparatus, comprising: at least one processor, wherein the at least one processor is coupled to at least one memory storing programming instructions executable by the at least one processor to perform operations comprising:
   receiving access capability information from a first network device through an E1 interface, wherein the first network device is a CU-user plane (CU-UP), the communications apparatus is a CU-control plane (CU-CP) or an apparatus in the CU-CP, wherein the first network device is a network device of a first-type network, the access capability information indicates a capability of the first network device to access a second-type network, and the first-type network is different from the second-type network, wherein the access capability information comprises a list of network identifiers of the second-type network that is allowed to be accessed by at least one cell, wherein the first-type network is a public land mobile network (PLMN), and the second-type network is a stand-alone non-public network (NPN); or the first-type network is a stand-alone NPN, and the second-type network is a PLMN, wherein the access capability information further comprises a list of slices that are allowed to be accessed by the at least one cell and a configured cell list of the NPN; and using the access capability information.

5. The communications apparatus according to claim 4, wherein the access capability information indicates a capability of at least one cell of the first network device to access the second-type network.

6. A communications system, comprising:
a first network device; and
a second network device, wherein
the first network device is configured to send access capability information to the second network device through an E1 interface, wherein the first network device is a CU-user plane (CU-UP), the second network device is a CU-control plane (CU-CP), wherein the first network device is a network device of a first-type network, the access capability information indicates a capability of the first network device to access a second-type network, and the first-type network is different from the second-type network, wherein the access capability information comprises a list of network identifiers of the second-type network that is allowed to be accessed by at least one cell, wherein the first-type network is a public land mobile network (PLMN), and the second-type network is a stand-alone non-public network (NPN); or the first-type network is a stand-alone NPN, and the second-type network is a PLMN, wherein the access capability information further comprises a list of slices that are allowed to be accessed by the at least one cell and a configured cell list of the NPN; and the second network device is configured to use the access capability information.

7. The communications system according to claim 6, wherein the access capability information indicates a capability of at least one cell of the first network device to access the second-type network.

8. The communications system according to claim 6, wherein the access capability information indicates a capability of at least one slice of the first network device to access the second-type network.

* * * * *